Patented Apr. 24, 1934

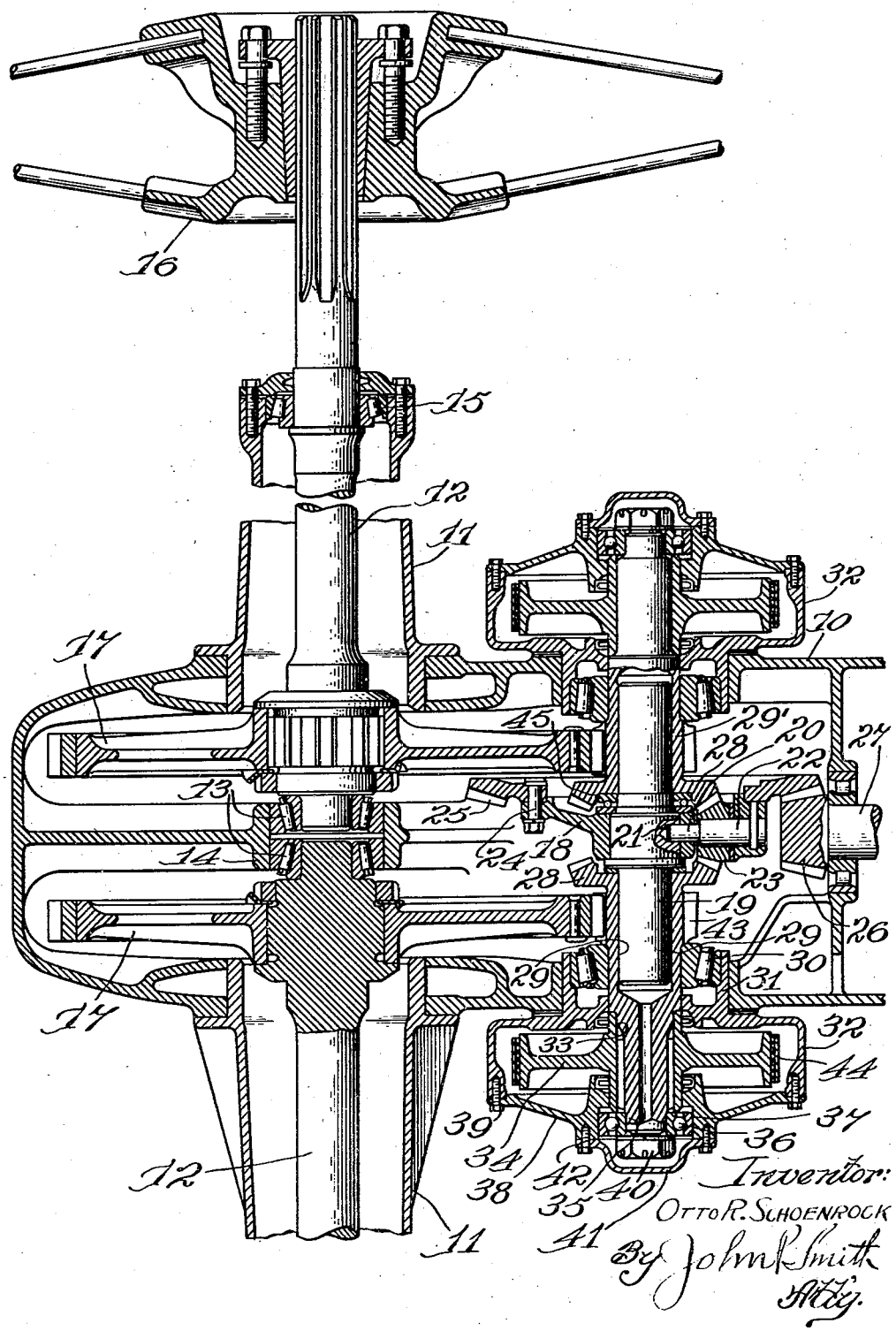

1,956,253

UNITED STATES PATENT OFFICE 1,956,253

TRACTOR CONSTRUCTION

Otto R. Schoenrock, Chicago, Ill., assignor to Oliver Farm Equipment Company, a corporation of Delaware Application September 4, 1931, Serial No. 561,211

4 Claims. (Cl. 180—17)

The present invention is directed generally to tractor construction but more particularly to a novel and improved combined braking and differential mechanism in which the braking is operatively asscciated with the differential mechanism for individually braking one or the other or both of the rear traction wheels of the tractor.

One of the objects of the present invention is to provide a novel improved constructicn of a braking and differential mechanism for tractor which is simple in design and efficient in operation.

A further object of the invention is to provide a novel and improved braking mechanism for tractor in which separate brake drums are connected directly to each of the individual differential bevel gears for effectively braking either or both of the rear traction wheels of the tractor.

A still further object of the invention is to provide a novel and improved construction of a combination differential and braking mechanism for a tractor in which the hub or sleeve of each of the differential bevel gears form the bearing for the shaft of the differential spider, and at the same time forms the support for each of the brake drums of the separate braking mechanism for each of the tractor wheels.

Referring to the drawing the single figure shows a cross-sectional view of a rear portion of a tractor showing the differential and rear axle housing thereof and the operative parts located therein embodying my improved construction.

In illustrating one form of my invention I have shown the same in connection with the rear portion of a tractor frame generally indicated by the reference character 10 which forms the housing for the differential mechanism and rear axle bull gears. Secure to the opposite sides of the bull gear housing are the usual axle sleeves or housings, members in which are mounted the rear axle sections 12. The inner adjacent ends of these axle sections 12 are mounted in suitable anti-friction bearings 13, which in turn are mounted in a bearing support 14 formed integrally with the bull gear housing. The outer portion of these axle sections are supported by the outer anti-friction bearings 15 (only one of which is shown) which in turn are secured to the outer ends of each of the axle sleeves or housings 11. Secure to the outermost end of each of the axle sections 12 are the usual traction wheels generally indicated by the reference character 16. Secure to the inner adjacent end of each of the axle sections 12 are bull gears 17.

The principal feature of the present invention is directed to a novel form of differential mechanism in combination with a braking mechanism for individually effecting a braking action on either or both of the rear traction wheels. This novel mechanism includes a differential spider 18, which is secured to a transverse differential shaft 19 by means of a pinion shaft 22 having a reduced end 20 seated in a radially disposed socket 21, formed in the shaft 19. Journalled on the pinicn shaft 22 and on the two other similar pinion shafts which are equally spaced apart on the spider 18 and meshing with the differential bevel gears 28, are bevel pinions 23. Secure to the differential spider 18 by means of bolts 24 is a differential bevel gear drive 25 which in turn meshes with a bevel pinion 26 secure to the rear end of the main drive shaft 27.

Formed integrally with each of the differential bevel gears 28 are sleeve extensions 29' whose internal bores 29 form the bearings for the differential shaft 19. The outer ends of each of the sleeve portions 29 are provided with shaft-like extensions which are of reduced diameter, as shown at 33, and are suitably splined about their peripheries for securely fastening thereon, the brake drums 34. The outermost ends of these shaft-like extensions are further reduced as shown at 35 for the purpose of accommodating anti-friction bearings 36 which in turn are located in the respective recesses 37 formed in the cover plates 38 which are secured to each of the brake drum housings 32 by means of bolt 39. The anti-friction bearings 36 are retained in place by nuts 40 which are mounted in threaded engagement with the outer ends of each of the shaft-like portions 33. The nuts 40 are each encased by a cap 41 which in turn is secured to the cover plate 38 by means of screws 42. Formed integrally with each of the sleeves 29' and located between the bevel gear 28 and the anti-friction bearings 30 are bull pinions 43 which in turn mesh with and drive the respective bull gears 17.

From the above description it will be readily seen that I have provided a simple, compact and easily manufactured combination differential and braking mechanism and one in which the individual brake drums for each of the traction wheels are secured to an integral part of each of the differential bevel gears. It will also be noted that the sleeves of these bevel gears form the bearings for the differential shaft which arrangment maintains these operative parts and particularly the gearing thereof in correct meshing relation.

It will of course be understood that each of these brake drums is provided with the usual brake bands 44 which are individually operable by the operator of the tractor through a foot treadle mechanism of any well known construction. Positioned between the right hand bevel gear 28 and the hub of the differential spider 18 is an anti-friction thrust bearing 45 which is for the purpose of sustaining the lateral thrust caused by the drive pinion 26 in operatively driving the differential ring gear 25.

From the above description it will be seen that by this novel arrangement of intimately tying the differential mechanism up with the separate braking mechanism for controlling the individual rear traction wheels, I have considerably simplified the structure and reduced the amount of work as well as the number of parts required in assembling or repairing this portion of the tractor.

While in the above specification I have described one embodiment which my invention may assume in practice it will of course be understood the same is capable of modification and that modification may be made without the departing from the spirit and scope of the invention as expressed in the following claims.

What I claim as my invention and desire to secure by Letters Patent is:

1. The combination of the differential mechanism, of a braking mechanism therefor including a differential shaft, a spider secured to this shaft, a differential bevel pinion journalled on said spider, differential bevel gears located on the opposite sides of said spider, sleeve portions formed integrally with the differential bevel gears forming the sole bearings for said shaft, and brake drums secured to the extended portions of said sleeves whereby a braking action may be applied to either side of said differential.

2. The combination with a differential mechanism, of a braking mechanism therefor including a differential shaft, a differential spider secured to said shaft, a differential pinion journalled on said spider, differential gears located on the opposite sides of said spider and geared to said pinions, sleeves formed integrally with said differential gears for forming the bearings for said shaft, bull pinions formed integrally with said sleeves, shaft-like extensions formed integrally with said sleeves, and brake drums secured to said shaft-like extensions.

3. The combination of a differential and braking mechanism for a tractor comprising sectional rear axle, bull gears secured to the inner ends of said axle sections, a differential shaft, a differential spider secured to said shaft, a differential pinion journalled on said spider, differential bevel gears engaging said pinion, bull pinions formed integrally with said differential gears and meshing with said bull gears, axial recesses formed on the inner end only of said differential gears for forming the bearings for said differential shaft, shaft-like extensions formed integrally with each of said bevel gears, and brake drums secured to said shaft-like extensions.

4. The combination of the differential and braking mechanism for a tractor comprising rear axle sections, bull gears secured to said axle sections, a differential shaft, a differential spider secured to said shaft, a differential pinion journalled on said spider, differential bevel gears engaging said pinions and having sleeve portions formed integrally therewith, said sleeve portions having sockets formed on the inner ends thereof for forming the bearings for said shaft, bull pinions formed integrally with said differential gears and meshing with said bull gears, a shaft-like extension formed integrally with said differential gears, brake drums secured to said shaft-like extensions, and anti-friction bearing supporting the intermediate and outer portions of said beveled gears and shaft-like extensions.

OTTO R. SCHOENROCK.